United States Patent [19]

Rittler

[11] 4,009,042
[45] Feb. 22, 1977

[54] TRANSPARENT, INFRA-RED TRANSMITTING GLASS-CERAMICS

[75] Inventor: Hermann L. Rittler, Horseheads, N.Y.

[73] Assignee: Corning Glass Works, Corning, N.Y.

[22] Filed: Jan. 15, 1976

[21] Appl. No.: 649,475

[52] U.S. Cl. .............................................. 106/39.7
[51] Int. Cl.² ...................... C03C 3/22; C03C 3/04
[58] Field of Search .................................. 106/39.7

[56] References Cited
UNITED STATES PATENTS 3,282,712  11/1966  Tashiro ............................. 106/39.7
3,642,504  2/1972  Petzold ............................. 106/39.7

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

The instant invention relates to the production of highly-crystalline, transparent glass-ceramic articles wherein the predominant crystal phase is a beta-quartz solid solution and which demonstrate transmittances of infra-red radiations up to about 80% at a wavelength of 3.5 microns in bodies having thickness dimensions of about 4 mm. The articles of the invention have compositions within a very narrow area of the $Li_2O$—$Al_2O_3$—$SiO_2$ field, nucleated with $TiO_2$, and wherein some of the silica is replaced with $AlPO_4$. Minor additions of $ZrO_2$ enhance the chemical durability of the articles and, if desired, coloring agents can be added to yield colored, transparent, crystalline articles.

1 Claim, No Drawings

TRANSPARENT, INFRA-RED TRANSMITTING GLASS-CERAMICS

BACKGROUND OF THE INVENTION

U.S. Pat. No. 2,920,971, the fundamental disclosure in the field of glass-ceramics, describes the manufacture of such bodies as requiring three general steps. First, a glass-forming batch, normally containing a nucleating agent, is melted. Second, the resulting melt is simultaneously cooled to a substantially crystal-free glass and an article of a desired configuration shaped therefrom. Third, this glass article is exposed to a specifically-defined heat treatment which causes the article to crystallize in situ. As is also explained in that patent, this crystallization heat treatment is commonly undertaken in two steps. Hence, the glass article is initially heated to a temperature somewhat above the transformation range of the glass to promote the development of nuclei therein. Thereafter, the nucleated glass is heated to a higher temperature, often above the softening point of the glass, to cause the growth of crystals on the nuclei.

Because a glass-ceramic article is derived through the essentially simultaneous growth of crystals on innumerable nuclei dispersed throughout the parent glass, the microstructure thereof comprises fine-grained crystals of relatively uniform size, homogeneously dispersed and randomly oriented in a residual glassy matrix. Glass-ceramic articles are normally highly crystalline, i.e., greater than 50% by volume crystalline. In view of this, the physical properties of such articles are more closely similar to those of the crystal phase than to those demonstrated by the residual glassy matrix. In addition, the residual glass will generally have a very different composition from that of the original or parent glass inasmuch as the components constituting the crystal phase will have been removed therefrom.

Glass-ceramics have been employed extensively in the manufacture of culinary ware. Thus, cooking vessels have been marketed under the trademark CORNING WARE and flat sheeting that has been utilized as cooking surfaces for stoves has been marketed under the trademark THE COUNTER THAT COOKS, both of these being the products of Corning Glass Works, Corning, New York.

In the field of culinary ware, and in particular the manufacture of cooking vessels, market surveys have indicated a desire for transparent utensils. Thus, transparent glass cooking vessels have been marketed under the trademark PYREX for many years. However, many glass-ceramic compositions are intrinsicly stronger and exhibit lower coefficients of thermal expansion than the borosilicate glass constituting the basis for the PYREX brand articles. Numerous transparent glass-ceramic compositions have been developed in the past but such have not found success in the marketplace for culinary ware.

To be useful for the application, not only must the material be mechanically strong, transparent, and have a low coefficient of thermal expansion, but it also must be chemically durable and resistant to food staining. Furthermore, the material as a glass must exhibit the necessary capabilities for large scale melting and forming. Thus, the commercial product must not only demonstrate desirable chemical and physical properties, but also must be amenable to practical, high speed production techniques. It is on this latter factor that many of the former candidates for cooking vessels have failed. For example, extremely high batch melting temperatures have been required, the glass derived from the melt has been very unstable, the viscosity of the glass has been such as to render it difficult to work and form, fire-polishing of the glass has not been successful, etc. In essence, previous transparent glass-ceramic compositions did not present the combination of production characteristics which is a practical necessity for conventional large scale melting and forming techniques.

The glass-ceramic materials, such as the CORNING WARE culinary ware noted above, which have been utilized in cooking vessels have customarily been opaque to visible light and very poorly transmitting in the infra-red portion of the radiation spectrum. An exception to those materials is disclosed in Ser. No. 603,544, filed Aug. 11, 1975 by the present applicant. The glass-ceramic articles described therein are opaque to visible light but have exhibited transmittances of up to 60% of radiations having a wavelength of 3.5 microns in samples having 4.25 mm. cross sections. The compositions thereof are encompassed within a very circumscribed range of the $Li_2O$—$ZnO$—$Al_2O_3$—$SiO_2$—$TiO_2$ system wherein beta-spodumene solid solution is the predominant crystal phase.

The hexagonal trapezohedral modification of $SiO_2$, viz., beta-quartz, is recognized to exhibit a slightly negative coefficient of thermal expansion. The crystal also demonstrates very low birefringence, i.e., optical anisotropy. This combination of characteristics has led to the development of transparent glass-ceramic bodies wherein the primary crystal phase is a solid solution having a beta-quartz structure (also frequently denominated as beta-eucryptite solid solution). The basis of the solid solution is considered to be the replacement of some of the silicon ions in beta-quartz with aluminum ions, with the concomitant charge deficiency being compensated with the entry of lithium, magnesium, and/or zinc ions into the quartz structure.

U.S. Pat. No. 3,157,522 discloses the production of glass-ceramic articles demonstrating transparency to visible light having compositions within the $Li_2O$—$Al_2O_3$—$SiO_2$—$TiO_2$ quaternary. However, those compositions are difficult to melt and form properly. This has led to the addition of modifying ingredients thereto which would improve those characteristics while not adversely affecting the physical properties of the final product to any great extent. The introduction of such conventional fluxes as $Na_2O$, $K_2O$, and $B_2O_3$ can raise the coefficient of thermal expansion excessively and/or impair the chemical durability and/or reduce the high temperature capability of the crystalline article. In an effort to avoid those phenomena, alkaline earth oxides have been added (note Examples 10-14 in Table II of the patent). The use of these components will improve the melting and forming capabilities of the parent glasses. but has the deleterious side effect of severely decreasing the transmittance of the final product to infra-red radiations.

Objectives of the Invention

The principal objective of the present invention is to produce transparent glass-ceramic articles demonstrating good mechanical strength, excellent chemical durability and resistance to detergent attack and food staining, low coefficient of thermal expansion, and which will exhibit a transmittance of greater than 40% and, normally, greater than 50% of infra-red radiation at a wavelength of 3.5 microns in samples of 4 mm. thickness.

A further vital objective of the instant invention is to provide such articles which can be produced through conventional, large scale production techniques.

Discussion of Prior Art

U.S. Pat. No. 3,252,811 discloses the manufacture of transparent glass-ceramic articles from compositions in the $XO-Al_2O_3-SiO_2$ field, nucleated with $ZrO_2$, having beta-quartz solid solution as the primary crystal phase. The XO member consisted of $Li_2O + ZnO$ and/or MgO. Such compositions required high melting temperatures, i.e., 1600°–1800° C, which are generally above conventional glass melting practice.

U.S. Pat. No. 3,241,985 describes the production of transparent glass-ceramic articles employing base glasses in the $Li_2O-Al_2O_3-SiO_2$ system nucleated with $ZrO_2$. Minor amounts of the alkali metals, the alkaline earth metals, and/or $TiO_2$ are customarily included.

U.S. Pat. No. 3,282,712 discusses the preparation of transparent glass-ceramic articles containing beta-eucryptite as the principal crystal phase from glasses in the $Li_2O-Al_2O_3-SiO_2-P_2O_5$ field nucleated with $ZrO_2 + TiO_2$. Up to 5% was included to aid in dissolving $ZrO_2$ in the melt. The $TiO_2$ content was maintained below 3% to achieve resistance to chemical attack. The introduction of the alkaline earth metals is suggested to improve the working properties of the parent glass.

U.S. Pat. No. 3,499,773 is drawn to the production of transparent glass-ceramic articles from compositions in the $Li_2O-Al_2O_3-SiO_2$ ternary, nucleated by $TiO_2$ and/or $ZrO_2$ and/or $SnO_2$, wherein beta-eucryptite comprises the primary crystal phase. Additions of alkali metals, alkaline earth metals, and $P_2O_5$ are suggested and the sole exemplary composition contained $Na_2O$, MgO, and $P_2O_5$.

U.S. Pat. No. 3,642,504 discloses the making of transparent glass-ceramic articles containing beta-quartz solid solution as the primary crystal phase from glasses in the $Li_2O-Al_2O_3-SiO_2-P_2O_5$ nucleated with $TiO_2$ and $ZrO_2$. At least 5% $P_2O_5$ is required and the preferred composition contains MgO. The patent notes the extensive replacement of $SiO_2$ by $AlPO_4$ in the beta-quartz solid solution.

U.S. Pat. No. 3,677,785 describes the production of transparent glass-ceramic articles utilizing base glasses in the $Li_2O-BaO-Al_2O_3-SiO_2$ field nucleated with $TiO_2 + ZrO_2$. The presence of BaO + MgO is stated to be especially critical to promote the solution of $ZrO_2$ in the moltent glass and to lower the liquidus.

U.S. Pat. No. 3,788,865 discusses the preparation of transparent glass-ceramic articles containing beta-eucryptite crystals from glasses in the $Li_2O-Al_2O_3-SiO_2$ system nucleated with $TiO_2$, $ZrO_2$, and/or $SnO_2$. $P_2O_5$ is observed as an optional ingredient up to 3% and the preferred compositions contained substantial amounts of alkaline earth oxides and/or $B_2O_3$. Various coloring additives are mentioned.

SUMMARY OF THE INVENTION

I have discovered that transparent glass-ceramic articles exhibiting good mechanical strength, excellent chemical durability and resistance to detergent attack and staining, low coefficient of thermal expansion (less than about $10 \times 10^{-7}/°$ C. over the range of room temperature to 300° C.), a transmittance of infra-red radiation in 4 mm. thickness of at least 40% and, preferably, greater than 50% at a wavelength of 3.5 microns, and wherein the parent glass demonstrates good melting and working characteristics can be achieved in compositions consisting essentially, by weight on the oxide basis, of about 3–4%, $Li_2O$, 20–30% $Al_2O_3$, 50–65% $SiO_2$, 3–7% $TiO_2$, 1.5–3% $ZrO_2$, and 2–5% $P_2O_5$. To attain the most desirable matrix of chemical and physical properties, additional alkali metal oxides, the alkaline earth metal oxides, and $B_2O_3$ will preferably be essentially absent, i.e., present in impurity amounts only if present at all. ZnO in an amount up to 5% can be a useful additive to modify the melting and forming character of the glass without seriously adversely affecting the physical properties of the final product. Where desired, conventional coloring agents such as $Co_3O_4$, NiO, $MnO_3$, $V_2O_5$, and/or $Cu_2O$, as well as most transition metal oxides, can be included to impart various shades of coloring to the crystalline articles.

Description of Preferred Embodiments

Table I records several exemplary compositions illustrating the parameters of the instant invention, tabulated in weight percent on the oxide basis. The batch ingredients employed may be any materials, either the oxides or other compounds, which, when melted together, will be converted into the desired oxide in the proper proportions. After compounding the batch materials and ballmilling them together to aid in obtaining a homogeneous melt, the mixture can be deposited into a platinum crucible. A lid will be placed thereupon, the crucible positioned within a gas-fired furnace operating at about 1600° C., and maintained therein for about 16 hours with stirring. The melt can then be poured into a steel mold to form a rectangular slab about 6'' × 6'' × ½'' which will be immediately transferred to an annealer operating at about 700° C. Samples of the proper geometry for testing purposes can be cut from the annealed slabs. $As_2O_3$ will perform its customary function as a fining agent. The colorant, $Co_3O_4$, is deemed to be added in excess to the base batch composition.

TABLE I

|  | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 61.4 | 60.3 | 60.0 | 63.4 | 62.1 | 56.1 | 59.9 | 60.1 | 56.1 | 61.9 | 53.9 | 54.1 | 63.1 |
| $Al_2O_3$ | 21.9 | 21.5 | 21.4 | 21.8 | 21.9 | 27.9 | 23.9 | 23.9 | 23.9 | 21.9 | 29.9 | 29.0 | 21.8 |
| $Li_2O$ | 3.4 | 3.3 | 3.3 | 3.5 | 3.5 | 3.5 | 3.5 | 3.5 | 3.5 | 3.5 | 3.5 | 4.3 | 3.5 |
| MgO | 0.5 | 0.5 | 0.5 | 0.3 | 0.2 | 0.2 | — | 0.2 | 0.2 | — | — | — | 0.2 |
| ZnO | 0.5 | 1.4 | 1.4 | 1.0 | — | — | 0.4 | — | — | 0.4 | 0.4 | 0.4 | — |
| $TiO_2$ | 4.3 | 4.2 | 4.2 | 4.9 | 6.2 | 6.2 | 6.2 | 6.2 | 6.2 | 6.2 | 6.2 | 4.3 | 6.2 |
| $ZrO_2$ | 1.9 | 2.4 | 1.8 | 1.5 | 1.5 | 1.5 | 1.5 | 1.5 | 1.5 | 1.5 | 1.5 | 2.9 | 1.5 |
| $As_2O_3$ | 0.5 | 0.5 | 0.5 | 0.6 | 0.06 | 0.6 | 0.6 | 0.06 | 0.06 | 0.6 | 0.6 | 0.5 | 0.6 |
| $P_2O_5$ | 5.1 | 5.0 | 5.0 | 3.0 | 4.0 | 4.0 | 4.0 | 4.0 | 4.0 | 4.0 | 4.0 | 4.5 | 3.1 |
| $B_2O_3$ | 0.5 | 0.9 | 1.9 | — | — | — | — | — | — | — | — | — | — |

TABLE I-continued

| | 1 | 2 | 3 | 4 | 5 | 6 | 7 | 8 | 9 | 10 | 11 | 12 | 13 |
|---|---|---|---|---|---|---|---|---|---|---|---|---|---|
| $Co_3O_4$ | — | — | — | — | — | — | — | — | — | — | — | — | 0.003 |

The glass bodies of the instant invention can be transformed into fine-grained glass-ceramic articles by being subjected to temperatures between about 750°–950° C. Because the rate of crystal growth is temperature dependent, a longer period of time will be required to achieve crystallization at the lower end of the crystallization range than at the hotter end. Thus, as brief a period as about 0.5 hour may be adequate at temperatures in the vicinity of 950° C., whereas, at temperatures in the cooler end of the range, times as long as 24 hours may be required to attain high crystallinity. Although it is possible to utilize longer crystallization schedules, such can lead to excessive grain growth of the crystal which results in the impairment of transparency due to the development of haze in the product.

Experience has demonstrated that better uniformity of crystal size is normally achieved where a two-step heat treatment is pursued. In this practice the glass body is initially heated to a temperature somewhat above the transformation range thereof and maintained threat for a length of time sufficient to insure a substantial development of nuclei. Subsequently, the nucleated body is heated to a temperature above the softening point of the glass to promote the growth of crystals on the nuclei. It will be recognized that, as the temperature of the glass body is raised above the transformation range and the softening point thereof, care must be exercised such that the rate of temperature increase is not so rapid that sufficient crystal growth is not promoted to support the body. Hence, where the glass body is heated too rapidly, deformation and/or slumping thereof can occur. Heating rates of up to 10° C./minute can be successfully employed where formers or other physical supports are utilized. However, heating rates no higher than about 5° C./minute have generally been found satisfactory where no supporting means are relied upon.

The use of a nucleation heat treatment is also helpful in decreasing the hazard of body deformation as the temperature of the glass is raised to the crystallization range since crystal growth will be more rapid where the glass is highly nucleated. In the preferred practice, the nucleation step will involve about 1–6 hours within the temperature range of about 675°–750° C., with subsequent crystallization being accomplished in about 1–8 hours at temperatures about 750°–950° C.

To permit visual inspection of glass quality and to cut samples for measuring various physical properties, the glass slabs of the exemplary composition of Table I will be annealed to room temperature. It must be appreciated that such practice is not required to achieve the desired highly crystalline products. Thus, the molten batch need only to be cooled to a temperature at least within the transformation range to produce an essentially crystal-free glass and thereafter the nucleation-crystallization heat treatment of the glass body begun. The transformation range has been defined as that temperature at which a liquid melt is deemed to have become an amorphous solid. That temperature has commonly been held to residue in the vicinity of the glass annealing point.

Table II reports nucleation and crystallization heat treatments which can be utilized with the glass bodies of Table I. Specific dwell periods at individual temperatures are commonly employed as a matter of convenience but such practice is not required. It is only necessary that the article be exposed to temperature within the nucleation and crystallization ranges. In the tabulated schedules, the glass articles will be heated in an electrically-fired furnace at a rate of about 5° C./minute to the recited dwell periods. After the crystallization hold, the electric current to the furnace will be cut off and the articles merely permitted to cool to room temperature retained within the furnace. It has been estimated that this rate of cooling at furnace rate averages about 3°–5° C./minute. Much more rapid cooling rates are quite feasible, of course, since the crystallized articles demonstrate a coefficient of thermal expansion over the range of room temperature (R.T.) to 300° C. of less than about $10 \times 10^{-7}/°$ C. Nevertheless, this cooling at furnace rate is of easy convenience.

Table II also records a visual description of the crystallized bodies as well as numerous measurements of such physical properties as coefficient of thermal expansion ($\times 10^{-7}/°$ C.) over the range of R.T. to 300° C., the percent transmittance of infra-red radiation at a wavelength of 3.5 microns through a polished plate of 4 mm. thickness, the liquidus (° C.), and the detergent durability of the crystalline material. X-ray diffraction analysis has indicated that the crystallization consists essentially totally of beta-quartz solid solution. Electron microscopy has determined the articles to be greater than 50% by volume crystalline and, commonly, greater than 75%. The crystals, themselves, are generally smaller than 5000A so as to provide transparency. In certain instances, the final product may exhibit a pale yellow or amber hue without colorant.

The following test has been developed to determine the resistance of a material to attack by detergents. A 0.3% aqueous solution of SUPAR SOILAX detergent, manufactured by Economics Laboratories, St. Paul, Minnesota, is prepared. The solution is heated to 95° C. and samples of the glass-ceramic bodies immersed therein, the surface areas of the samples being limited by the ratio of 12 square inches to one pound of the solution. Samples are removed periodically from the hot solution, rinsed in tap water, and wiped dry. A portion of the glass-ceramic surface is coated with SPOTCHECK dye penetrant, marketed by Magnaflux Corporation, Chicago, Illinois, and the dye allowed to stand thereon for 20 seconds in the ambient environment. The dye is dried and the surface cleaned with a household cleanser powder for about 30 seconds. A double A rating (AA) indicates that a slight stain is observed after an immersion of 68 hours in the detergent solution.

Two glass-ceramics which have been and are commercially marketed for cooking applications are Corning Code 9608 and Corning Code 9617, both being products of Corning Glass Works, Corning, New York. In the above test, the Code 9608 material displayed a slight stain after an immersion of six hours in the detergent solution, and the Code 9617 material after a 16-hour immersion.

than about $10 \times 10^{-7}/°$ C., excellent detergent durability, an infra-red transmittance at a wavelength of 3.5

TABLE II

| Example No. | Heat Treatment | Exp. Coef | Infra-Red | Liquidus | Durability | Visual Description |
|---|---|---|---|---|---|---|
| 1 | 2 hours at 700° C.<br>2 hours at 850° C. | 3.3 | | | AA | Clear, transparent |
| 2 | 2 hours at 700° C.<br>2 hours at 700° C. | 3.6 | | 1310° C. | | Clear, transparent |
| 3 | 2 hours at 700° C.<br>2 hours at 850° C. | 14.5 | | | | Amber, transparent |
| 4 | 2 hours at 700° C.<br>2 hours at 950° C. | 2.8 | | | | Amber, transparent |
| 5 | 2 hours at 700° C.<br>2 hours at 900° C. | 3.4 | 59% | 1379° C. | AA | Amber, transparent |
| 6 | 2 hours at 700° C.<br>2 hours at 900° C. | | | 1409° C. | AA | Amber, transparent |
| 7 | 2 hours at 700° C.<br>2 hours at 900° C. | 2.1 | 49% | 1363° C. | AA | Amber, transparent |
| 8 | 2 hours at 700° C.<br>2 hours at 900° C. | 4.8 | | | | Purple, transparent |
| 9 | 2 hours at 700° C.<br>2 hours at 900° C. | 6.5 | | | | Blue, transparent |
| 10 | 2 hours at 700° C.<br>2 hours at 900° C. | 1.4 | | | | Lavendar, transparent |
| 11 | 2 hours at 700° C.<br>2 hours at 900° C. | 10.0 | | | | Blue, transparent |
| 12 | 2 hours at 700° C.<br>2 hours at 900° C. | 5.0 | 60% | | | Blue, transparent |
| 13 | 2 hours at 700 C.<br>2 hours at 900 C. | | | | | Gray, transparent |

Example 3 clearly points out the adverse effect upon the coefficient of thermal expansion which the inclusion of any substantial amount of $B_2O_3$ can have. The addition of $Co_3O_4$ to Example 13 yielded a transparent article exhibiting a neutral gray tint.

I claim:

1. A transparent glass-ceramic article exhibiting a coefficient of thermal expansion (R.T. to 300° C.) less than about $10 \times 10^{-7}/°$ C., excellent detergent durability, an infra-red transmittance at a wavelength of 3.5 microns through a polished plate of about 4 mm. thickness greater than 40%, and wherein the crystal phase consists essentially of beta-quartz solid solution, which consists essentially, by weight on the oxide basis, of about 3–4% $Li_2O$, 20–30% $Al_2O_3$, 50–65% $SiO_2$, 3–7% $TiO_2$, 1.5–3% $ZrO_2$, and 2-5% $P_2O_5$, and wherein additional alkali metal oxides, the alkaline earth metal oxides, and $B_2O_3$ are essentially absent.

* * * * *